United States Patent
Wu

(10) Patent No.: US 8,345,965 B2
(45) Date of Patent: Jan. 1, 2013

(54) METHOD AND APPARATUS FOR POSITIONING EDGES OF PHOTOGRAPH

(75) Inventor: Wen-Yi Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 667 days.

(21) Appl. No.: 12/612,478

(22) Filed: Nov. 4, 2009

(65) Prior Publication Data
US 2011/0052054 A1     Mar. 3, 2011

(30) Foreign Application Priority Data
Aug. 31, 2009    (CN) .......................... 2009 1 0306407

(51) Int. Cl.
*G06K 9/00*      (2006.01)

(52) U.S. Cl. ........................................................ 382/162
(58) Field of Classification Search ................. None
See application file for complete search history.

(56) References Cited

U.S. PATENT DOCUMENTS

| | | | |
|---|---|---|---|
| 6,011,857 A * | 1/2000 | Sowell et al. | 382/100 |
| 6,175,844 B1 * | 1/2001 | Stolin | 715/210 |
| 7,519,236 B2 * | 4/2009 | Cheng et al. | 382/305 |
| 8,044,955 B1 * | 10/2011 | Yhann | 345/423 |

* cited by examiner

*Primary Examiner* — Alex Liew
(74) *Attorney, Agent, or Firm* — Altis Law Group, Inc.

(57) ABSTRACT

A method for positioning edges of a photograph, includes flowing steps. A photograph taken by a camera module of an electronic device is obtained. RGB values of the pixels of the photograph are processed to get corresponding RGB modification values of the pixels of the photograph. Positions of vertexes of the photograph are computed according to the RGB modification values. The vertexes are connected to form edges of the photograph.

13 Claims, 3 Drawing Sheets

METHOD AND APPARATUS FOR POSITIONING EDGES OF PHOTOGRAPH

BACKGROUND

1. Technical Field

The present disclosure relates to position methods and apparatuses, and particularly to a method and apparatus for positioning edges of a photograph.

2. Description of Related Art

At present, more and more electronic devices are equipped with camera modules for taking photographs. It often needs to test the camera modules before these electronic devices come into the market. The test often includes testing whether the photographs have black margins, spots, and so on.

However, if fringes of the photograph cannot be positioned precisely, the test cannot be accurately implemented, and can not acquire right test results. For example, when testing whether a photograph having spots, the photograph is divided into a plurality of small areas, and then check if a density of each of the small areas is smaller than a pre-set threshold value. If the fringes of the photograph are wrongly positioned, the above test often gets wrong result.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
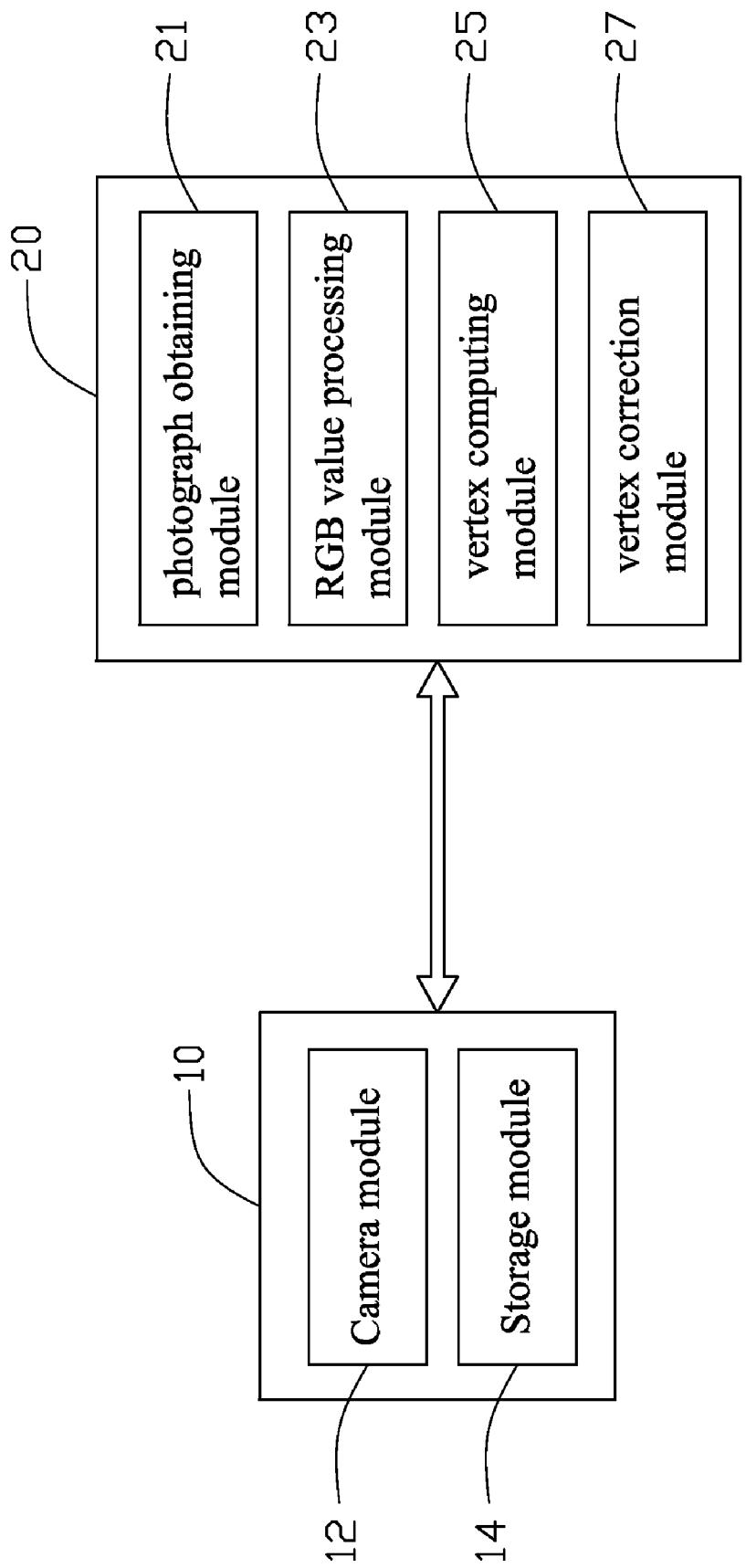
FIG. 1 is a block view of an apparatus for positioning the edges of a photograph.

Referring to FIG. 1, an apparatus in an embodiment for positioning edges of a photograph, includes an electronic device 10 and an edge positioning device 20.

The electronic device 10 includes a camera module 12 for taking photograph, and a storage module 14 for storing the photographs taken by the camera module 12.

The edge positioning device 20 is used to position edges of the photographs taken by the electronic device 10. The edge positioning device 20 includes a photograph obtaining module 21, a RGB (red, green, blue) value processing module 23, a vertex computing module 25, and a vertex correction module 27. The photograph obtaining module 21 obtains photograph from the electronic device 10.

The RGB value processing module 23 is capable of processing the RGB values of all of the pixels of a photograph. For example, if a photograph has a scale of 2048 Pixel*1536 Pixel, positions of the pixels of the photograph are (x, y), specifically, (1, 1), (1, 2) . . . (1, 1536) . . . (2048, 1536), and RGB values of the pixels are set to f(x, y), specifically, f(1, 1), f(1, 2) . . . f(1, 1536) . . . f(2048, 1536). The RGB value processing module 23 processes these RGB values to get corresponding RGB modification values G(x, y) according to the following formula:

$$\Delta x f(x,y) = f(x-1,y+1) + 2f(x,y+1) + f(x+1,y+1) - f(x-1,y-1) - 2f(x,y-1) - f(x+1,y-1);$$

$$\Delta y f(x,y) = f(x-1,y-1) + 2f(x-1,y) + f(x-1,y) + f(x-1,y+1) - f(x+1,y-1) - 2f(x+1,y) - f(x+1,y+1);$$

then, $G(x,y) = |\Delta x f(x,y)| + |\Delta y f(x,y)|$.

Figure 2:
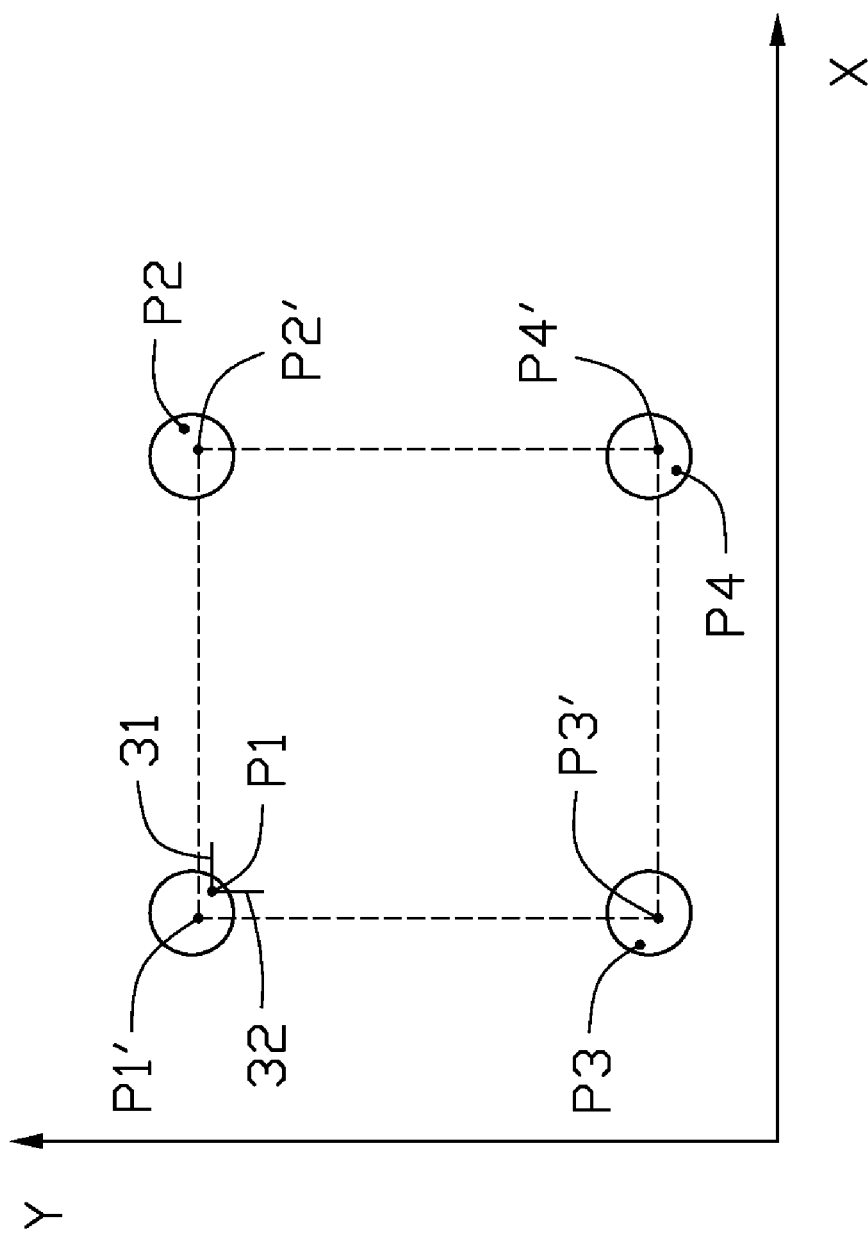
FIG. 2 is a sketch view of positioning vertexes on a photograph.

Referring to FIGS. 1 and 2, the vertex computing module 25 is used to position the vertexes of the photograph. The vertex computing module 25 sets one area on each corner of the photograph, for example, setting four circular areas on four corners of a photograph 100 which is taken by the electronic device 10. The vertex computing module 25 compares RGB modification value G(x, y) of different pixel in one circular area with a threshold value which is pre-set by the vertex computing module 25, until gets a pixel whose RGB modification value G(x, y) is greater than the threshold value. A line 31 extends horizontally from the gotten pixel, and another line 32 extends vertically from the gotten pixel. RGB modification values G(x, y) of twenty pixels which are on each of the lines 31 and 32 and adjacent the gotten pixel are compared to the threshold value. If most of the twenty pixels on the lines 31 and 32 are greater than the threshold vale, it represents RGB modification value is continuous from the gotten pixel, and the gotten pixel is set as an vertex, such as the pixels P1, P2, P3, and P4 in FIG. 2.

The vertex correction module 27 is used to correct the positions of the vertexes set by the vertex computing module 25. For example, if positions of the pixels of the pixels P1, P2, P3, and P4 are respectively P1(x1, y1), P2(x2, y2), P3(x3, y3), and P4(x4, y4). Then, the corrected vertexes are respectively P1'((x1+x3)/2, (y1+y2)/2), P2'((x2+x4)/2, (y1+y2)/2), P3' ((x1+x3)/2, (y3+y4)/2), and P4'((x2+x4)/2, (y3+y4)/2). The vertexes P1', P2', P3', and P4' are connected in order to form edges of the photograph. Then, the edges of the photograph are precisely positioned to assure correctness of the test of photograph.

Figure 3:
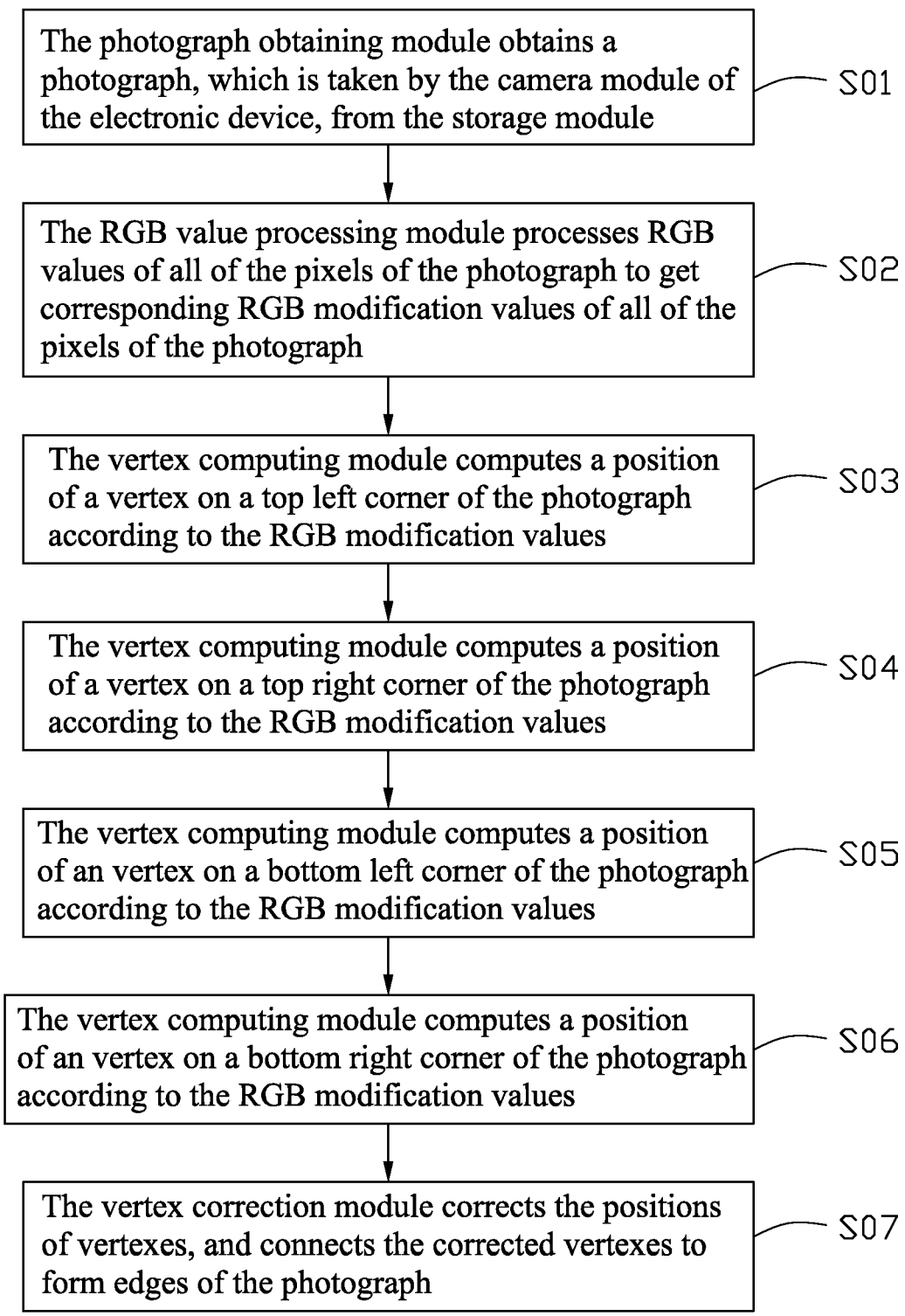
FIG. 3 is a flow view of a method for positioning edges of a photograph.

Referring to FIG. 3, a method for positioning edges of a photograph in an embodiment, includes following steps.

In step S01, the photograph obtaining module 21 obtains a photograph, which is taken by the camera module 12 of the electronic device 10, from the storage module 14;

In step S02, the RGB value processing module 23 processes RGB values of all of the pixels of the photograph to get corresponding RGB modification values of all of the pixels of the photograph;

In step S03, the vertex computing module 25 computes a position of a vertex on a top left corner of the photograph according to the RGB modification values;

In step S04, the vertex computing module 25 computes a position of a vertex on a top right corner of the photograph according to the RGB modification values;

In step S05, the vertex computing module 25 computes a position of an vertex on a bottom left corner of the photograph according to the RGB modification values;

In step S06, the vertex computing module 25 computes a position of an vertex on a bottom right corner of the photograph according to the RGB modification values;

In step S07, the vertex correction module 27 corrects the positions of vertexes, and connects the corrected vertexes to form edges of the photograph.

In the above method, the step S07 can be omitted. After the vertex computing module 25 computes positions of four vertexes of the photograph, the four vertexes can be connected to form the edges of the photograph directly.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for positioning edges of a photograph, comprising:

obtaining a photograph taken by a camera of an electronic device;

processing RGB values of the pixels of the photograph to get corresponding RGB modification values of the pixels of the photograph;

computing positions of vertexes of the photograph according to the RGB modification values in following steps:

setting a threshold value and an area on a corner of the photograph;

comparing RGB modification values of different pixels in the area with the threshold value until getting a first pixel whose RGB modification value is greater than the threshold value; and comparing RGB modification values of adjacent pixels, that are adjacent to the first pixel, with the threshold value, if most of the RGB modification values of adjacent pixels are greater than the threshold value, the first pixel is set as a vertex;

connecting the vertexes to form edges of the photograph.

2. The method of claim 1, wherein at least two of the adjacent pixels is picked from a first line which extends horizontally from the first pixel and a second line which extends vertically from the first pixel.

3. The method of claim 1, wherein each of the top left, top right, bottom left, and bottom right corners of the photograph is set an area to define a vertex on each corner.

4. The method of claim 3, wherein after computing positions of vertexes of the photograph, the positions of the vertexes are adjusted according to the relative positions of the vertexes on the corners.

5. The method of claim 4, wherein the positions of the vertexes are by setting positions of the four vertexes being respectively $(x1, y1)$, $(x2, y2)$, $(x3, y3)$, and $(x4, y4)$; and adjusting the positions of the vertexes respectively to $((x1+x3)/2, (y1+y2)/2)$, $((x2+x4)/2, (y1+y2)/2)$, $((x1+x3)/2, (y3+y4)/2)$, and $((x2+x4)/2, (y3+y4)/2)$.

6. The method of claim 1, wherein processing RGB values of the pixels is done in such a manner that if a position of a pixel is $(x, y)$, a RGB value is $f(x, y)$, and a corresponding RGB modification value is $G(x, y)=|\Delta xf(x, y)|+|\Delta yf(x, y)|$, wherein $\Delta xf(x, y)=f(x-1, y+1)+2f(x, y+1)+f(x+1, y+1)-f(x-1, y-1)-2f(x, y-1)-f(x+1, y-1)$; $\Delta yf(x, y)=f(x-1, y-1)+2f(x-1, y)+f(x-1, y+1)-f(x+1, y-1)-2f(x+1, y)-f(x+1, y+1)$.

7. An apparatus for positioning edges of a photograph, comprising:

a photograph obtaining module capable of obtaining a photograph taken by a camera module of an electronic device;

a RGB value processing module capable of processing RGB values of the pixels of the photograph to get corresponding RGB modification values of the pixels of the photograph; and a vertex computing module capable of computing positions of vertexes of the photograph according to the RGB modification values and edges of the photograph formed by the vertexes being connected;

wherein the vertex computing module is capable of setting a threshold value and a first area on a corner of the photograph, the vertex computing module is capable of comparing RGB modification value of different pixels in the first area with the threshold value until getting a first pixel whose RGB modification value is greater than the threshold value and comparing the RGB modification values of adjacent pixels of the first pixel with the threshold value; when most of the RGB modification values of adjacent pixels are greater than the threshold value, the first pixel is set as a first vertex.

8. The apparatus of claim 7, wherein a first line extends horizontally from the first pixel, a second line extends vertically from the first pixel; and the adjacent pixels are located on the first or second line.

9. The apparatus of claim 7, wherein the vertex computing module is capable of setting an area on each of the top left, top right, bottom left, and bottom right corners of the photograph, and defines four vertexes which comprises the first convex on four above areas.

10. The apparatus of claim 9, further comprising a vertex correction module which is capable of adjusting the positions of the vertexes according to the relative positions of the vertexes.

11. The apparatus of claim 10, wherein the vertex correction module is capable of adjusting positions of the vertexes in such a manner that set positions of the four vertexes being respectively $(x1, y1)$, $(x2, y2)$, $(x3, y3)$, and $(x4, y4)$, and adjust the positions of the vertexes respectively to $((x1+x3)/2, (y1+y2)/2)$, $((x2+x4)/2, (y1+y2)/2)$, $((x1+x3)/2, (y3+y4)/2)$, and $((x2+x4)/2, (y3+y4)/2)$.

12. The apparatus of claim 7, wherein the RGB value processing module is capable of processing RGB values in such a manner that if a position of a pixel is $(x, y)$, a RGB value is $f(x, y)$, and a corresponding RGB modification value is $G(x, y)=|\Delta xf(x, y)|+|\Delta yf(x, y)|$, wherein $\Delta xf(x, y)=f(x-1, y+1)+2f(x, y+1)+f(x+1, y+1)-f(x-1, y-1)-2f(x, y-1)-f(x+1, y-1)$; $\Delta yf(x, y)=f(x-1, y-1)+2f(x-1, y)+f(x-1, y+1)-f(x+1, y-1)-2f(x+1, y)-f(x+1, y+1)$.

13. A positioning method for positioning edges of a photograph, comprising:

providing a photograph obtaining module capable of obtaining a photograph taken by a camera module of an electronic device, a RGB value processing module capable of processing RGB values of the pixels of the photograph to get corresponding RGB modification values of the pixels of the photograph, and a vertex computing module capable of computing positions of vertexes of the photograph according to the RGB modification values; obtaining a photograph taken by the camera of the electronic device by the photograph obtaining module;

processing RGB values of the pixels of the photograph to get corresponding RGB modification values of the pixels of the photograph by the RGB value processing module;

computing positions of vertexes of the photograph according to the RGB modification values by the vertex computing module in following steps:

setting a threshold value and an area on a corner of the photograph;

comparing RGB modification values of different pixels in the area with the threshold value until getting a first pixel whose RGB modification value is greater than the threshold value; and comparing RGB modification values of adjacent pixels, that are adjacent to the first pixel, with the threshold value, if most of the RGB modification values of adjacent pixels are greater than the threshold value, the first pixel is set as a vertex;

connecting the vertexes to form edges of the photograph.

* * * * *